United States Patent [19]
Haigo et al.

[11] Patent Number: 5,053,806
[45] Date of Patent: Oct. 1, 1991

[54] HEAT FIXING APPARATUS

[75] Inventors: Hideaki Haigo; Yoshinori Endo, both of Nagoya, Japan

[73] Assignee: Brother Kogyo Kabushiki Kaisha, Nagoya, Japan

[21] Appl. No.: 619,417

[22] Filed: Nov. 29, 1990

[30] Foreign Application Priority Data

Dec. 27, 1989 [JP] Japan .................................. 1-342285

[51] Int. Cl.[5] .............................................. G03B 27/52
[52] U.S. Cl. ........................................ 355/30; 355/27; 355/285
[58] Field of Search .................... 355/27, 30, 282, 285

[56] References Cited

U.S. PATENT DOCUMENTS 4,367,037 1/1983 Nishikawa .......................... 355/285
4,474,456 10/1984 Kobayashi et al. ................ 355/285

*Primary Examiner*—Richard A. Wintercorn
*Attorney, Agent, or Firm*—Oliff & Berridge

[57] ABSTRACT

A heat fixing apparatus fixes a transferred image onto a sheet with application of heat. A heat generating device is provided in a housing, and has a plurality of divided heaters for generating heat. A plurality of sensors are provided in the housing to detect temperatures corresponding to individual heaters. A temperature control unit controls the individual heaters respectively corresponding to the temperatures detected by the sensors.

16 Claims, 6 Drawing Sheets

HEAT FIXING APPARATUS

BACKGROUND OF THE INVENTION

1. Field of the Invention

The present invention relates to a heat fixing unit for fixing an image on a sheet and more particularly to a heat fixing unit for fixing an image on a sheet with application of heat in an image forming apparatus such as a copying machine.

2. Description of the Related Art

It has been customary heretofore in an image forming apparatus such as a copying machine that a heat fixing unit is used for fixing a transferred image onto a sheet.

As shown in FIG. 5, this type of conventional heat fixing unit constitutes a single heater 40, a single temperature sensor 41 arranged in the vicinity of the heater 40, a crossflow fan 42 for blowing out hot air heat generated from the heater 40, a motor 43 for rotating the crossflow fan 42, and a casing 44 for housing the above devices therein in a state insulated from the exterior. The heat fixing unit controls the temperature of the heater 40 in accordance with the result detected by the temperature sensor 41 irrespective of the length of the heater 40.

In the related-art heat fixing unit, a difference in temperature is generated in the longitudinal direction of the heater because the heater is long and the heat leaks out to the exterior with a limitative heat resistance. The single temperature sensor cannot detect the distribution of temperature, thus resulting in nonuniformity of a temperature distribution as shown in FIG. 6.

SUMMARY OF THE INVENTION

Accordingly, it is an object of the present invention to provide a heat fixing unit capable of stable heat fixation with respect to an image output sheet with uniformity of temperature distribution.

It is a further object of the present invention to provide a heat fixing unit which is able to be used with heat generating mechanisms of varied length.

In order to achieve the above objects and advantages, according to the present invention, there is provided a heat fixing apparatus for fixing a transferred image onto a sheet with application of heat, comprising: a housing; heat generating means provided in the housing, the heat generating means having a plurality of separate heaters for generating heat; a plurality of sensors provided in the housing to detect temperatures corresponding to the separate heaters; and temperature control means for individually controlling each of the heaters in response to the temperatures detected by the sensors.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

Figure 1:
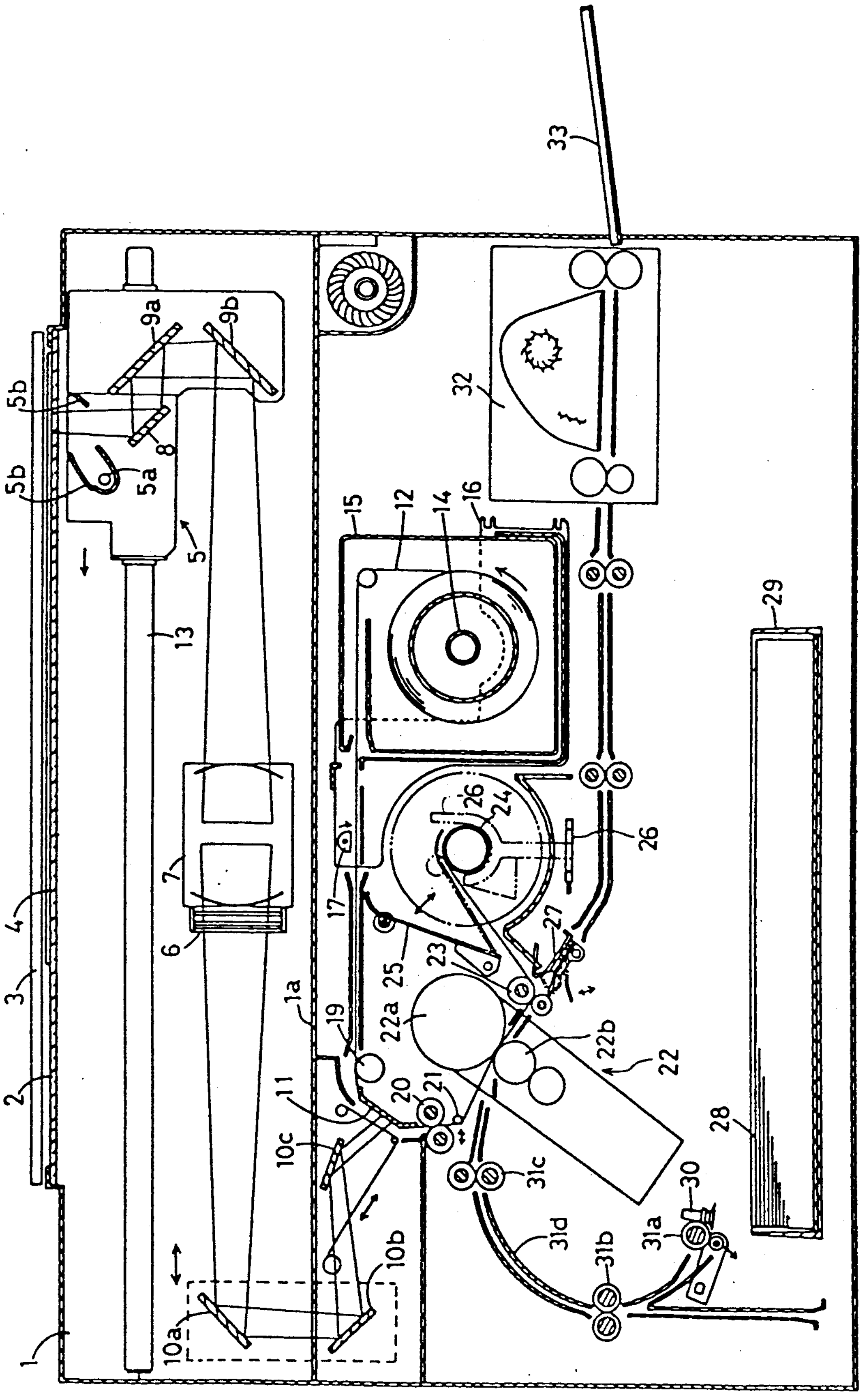
FIG. 1 is an overall cross-sectional view of a photosensitive, pressure-sensitive copying machine.

Referring now to the drawings, and particularly to FIG. 1 thereof, a preferred embodiment of the present invention is described.

As shown in FIG. 1, a photosensitive, pressure-sensitive copying machine 1 according to the present invention employs a photosensitive member constituted of an elongated photosensitive, pressure-sensitive sheet 12 (hereinafter referred to as a "microcapsule sheet") and a developer sheet 28 in an overlapped state.

The supporter of the microcapsule sheet 12 employed in this embodiment is coated on the surface thereof with microcapsules encapsulating therein a dye precursor or the like reactable with a developer described below. The developer is coated over the supporter of the developer sheet 28 on the surface thereof and reacts with the dye precursor to develop color. The details are disclosed in U.S Pat. No. 4,399,209 and, therefore, a further description is omitted.

A transparent original support glass 2 and an original support cover 3 are provided at the upper portion of the copying machine 1. The original support cover 3 is closed with a desired original 4 placed upside down on the original support glass 2.

Under the original support glass 2 provided at the upper portion of the copying machine 1, a light source 5 comprising a halogen lamp 5*a*, reflectors 5*b*, and a reflection mirror 8 are arranged in such a manner as to be reciprocally movable along a shaft 13 disposed in parallel with the original support glass 2. The light source 5 emits a streak of light toward the original support glass 2 in a direction perpendicular to the moving direction. The emitted light passes through the transparent original support glass 2 to be reflected downward on the original 4 mounted on the original support glass 2.

Under the original support glass 2 is further disposed a mirror unit 9 consisting of a pair of reflection mirrors 9*a* and 9*b* and capable of moving independently of the light source 5. The light reflected on the original 4 is further reflected on the reflection mirrors 8, 9*a* and 9*b* in order to be directed in a direction in parallel with the moving direction of the light source 5.

Below the original support glass 2 are arranged a normally stationary projection lens 7 and a filter 6 for adjusting a color tone of a copied image. The light reflected on the reflection mirror 9*b* projects onto the projection lens 7. The light projected onto the projection lens 7 is reflected on reflection mirrors 10*a* and 10*b*.

On the right of the reflection mirror 10*b* there is provided an exposure stand 11 for exposing the microcapsule sheet 12 to the light. Between the reflectionmirror 10*b* and the exposure stand 11 is disposed the other reflection mirror 10*c* for changing a light path. An image of the original 4 is formed on the microcapsule sheet 12 arranged along the exposure stand 11.

The reflection mirrors 10*a* and 10*b*, which are normally stationary, are movable integrally in the axial direction of the shaft 13 in order to change a light path length in accordance with a variation in a projected magnification m at the time of enlargement or reduction of a latent image formed on the microcapsule sheet 12.

On the other hand, a detachable cartridge 15 is installed at the central portion of the copying machine 1. The elongated microcapsule sheet 12 is held in the cartridge 15 in such a state as to be wound around a cartridge shaft 14. The leading end of the microcapsule sheet 12 is drawn out toward the exposure stand 11 with the cartridge 15 installed in the specific position inside the machine 1. A feed roller 19 is disposed above the exposure stand 11 while a feed roller 20 and a dancer roller 21 for adjusting tension are disposed below the exposure stand 11. On the right side of the dancer roller 21 is disposed a pressure developing unit 22 provided with a large-diameter roller 22*a* and a back-up roller 22*b*. Furthermore, on the right side of the pressure developing unit 22 is arranged a separation roller 23 for separating the microcapsule sheet 12 and the developer sheet 28 from each other which are in intimate contact with each other as described later. Between the separation roller 23 and the cartridge 15, there is disposed a take-up shaft 24 for winding and holding the microcapsule sheet 12. The microcapsule sheet 12 fed from the upper portion of the cartridge 15 passes under a guidance of a tension roller 19 through the exposure stand 11, dancer roller 21, pressure developing unit 22 and separation roller 23 in sequence, to be wound around the take-up shaft 24. As for an unexposed part of the microcapsule sheet 12 fed from the cartridge 15, a shielding cover 1*a* maintains the unexposed state. At a position below the pressure developing unit 22 is installed a sheet cassette 29 for containing a stack of the developer sheets 28 therein. Above the sheet cassette 29 is disposed a suction type sheet feed mechanism 30 for absorbing the sheet with a negative pressure to take up the developer sheets 28 one by one. Between the sheet feed mechanism 30 and the pressure developing unit 22, feed rollers 31*a*, 31*b* and 31*c* and a feed guide 31*d* are provided to feed the developer sheet 28 into the pressure developing unit 22.

On the right of the pressure developing unit 22 is installed a heat fixing unit 32, and moreover, on the right thereof, there is disposed a discharge tray 33 for mounting the developer sheet 28 thereon after the formation of an image.

The copying machine 1 according to the present invention possesses an automatic loading function for automatically loading the microcapsule sheet 12 on a predetermined feed path inside the machine 1. This automatic loading function comprises automatically drawing out a leader film portion attached to the leading end of the microcapsule sheet 12, feeding it in the machine 1, and winding it around the take-up shaft 24. Consequently, the microcapsule sheet 12 attached to the trailing end of the leader film portion is also wound around the take-up shaft 24, and thus, the loading thereof inside the machine 1 can be completed.

In this automatic loading operation, a sector roller 17 for drawing out the leader film portion is interposed between the roller 19 and the cartridge 15. Furthermore, a separation chute 27 for introducing the leader film portion to the take-up shaft 24 is rotatably disposed. An upper take-up guide 25 and a lower take-up guide 26 used for winding up the leader film portion are arranged above and below the take-up shaft 24.

Next, the operation of the copying machine 1 according to this invention will be explained hereunder.

Upon installation of the cartridge 15 in the copying machine 1, the automatic loading operation is initiated.

The sector roller 17 rotates once or more in the feeding direction only at the start of the automatic loading operation, to feed the leader film portion up to the rollers 20 and, subsequently, the sector roller 17 comes to a halt so that the rollers 20 are driven to feed the leader film portion.

The upper and lower take-up guides 25, 26 and separation chute 27 are moved to positions indicated by dashed lines in FIG. 1, respectively. Upon completion of the automatic loading operation for winding the leader film portion attached to the leading end of the microcapsule sheet 12 around the take-up shaft 24, the upper and lower take-up guides 25, 26 and separation chute 27 return to respective positions indicated by the solid lines in FIG. 1, thereby enabling a copying operation to proceed.

Assuming that the feeding velocity and projected magnification of the microcapsule sheet 12 are V and m, respectively, the reflection mirror 8 and the halogen lamp 5*a* moves at a moving speed 1/mV while the reflection mirrors 9*a* and 9*b* move at a moving speed $\frac{1}{2}$ mV upon operation of a copy start key.

Because the feeding velocity V of the microcapsule sheet 12 is synchronous with the moving speed of the mirrors 8, 9*a* and 9*b* as described above, the latent images of the specific lines on the original 4 are formed in sequence on the microcapsule sheet 12 as the sheet 12 passes over the exposure stand 11. The above speed ratio is previously determined in accordance with the magnification.

The microcapsule sheet 12 on which a latent image is formed is fed, and at the same time, the developer sheet 28 at the uppermost position on the sheet cassette 29 is fed out by a sheet feed mechanism 30, feed rollers 31*a*, 31*b* and 31*c*, etc.

The microcapsule sheet 12 and the developer sheet 28 in a tightly superposed state are supplied to the pressure developing unit 22, that is, the latent image-formed surface of the microcapsule sheet 12 and the developer-coated surface of the developer sheet 28 in inside contact with each other are held between the large-diameter roller 22*a* and back-up roller 22*b* with application of pressure. With this pressure, the unexposed microcapsules are ruptured, thus forming a visible image on the developer sheet 28.

The microcapsule sheet 12 passed through the pressure developing unit 22 is separated from the developer sheet 28 by the separation roller 23 and, subsequently, the color visible image formed on the developer sheet 28 is expedited by a heat fixing unit 32. The developer sheet 28 is discharged to the discharge tray 33 by a discharge roller 32*b*. Meanwhile, the separated microcapsule sheet 12 is wound around the take-up shaft 24 via the separation roller 23.

Figure 2:
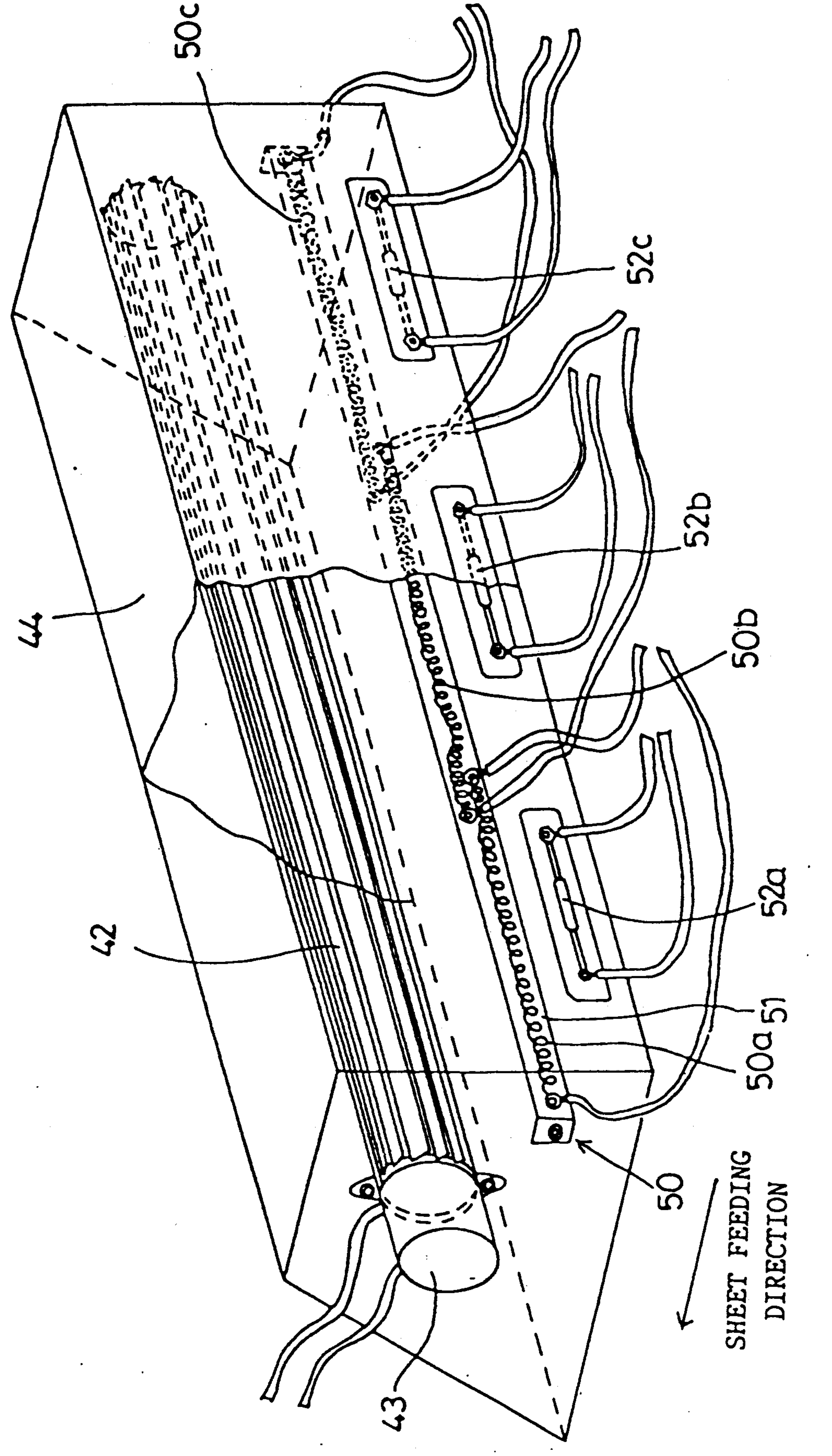
FIG. 2 is a perspective view of a heat fixing unit in a preferred embodiment according to the present invention.

FIG. 2 shows the detailed structure of the heat fixing unit 32 installed inside the photosensitive, pressure-sensitive copying machine 1 illustrated in FIG. 1.

The heat generating mechanism 50 of the heat fixing unit 32 is divided into three heaters 50*a*, 50*b* and 50*c* to be attached to a mica plate (insulator) 51, and the heaters 50*a*, 50*b* and 50*c* are disposed such that their end portions overlap one another. The mica plate 51 is secured at both ends thereof to a casing 44 and is arranged perpendicular to the traveling direction of the developer sheet 28. Temperature sensors 52*a*, 52*b* and 52*c* are arranged in the vicinity of the heaters 50*a*, 50*b* and 50*c*, respectively. A crossflow fan 42 for blowing air to the heaters is rotated by a motor 43 to blow hot air downward, and consequently, the color-development of the developer sheet 28 passing downward is expedited, thus resulting in heat fixation.

Figure 3:
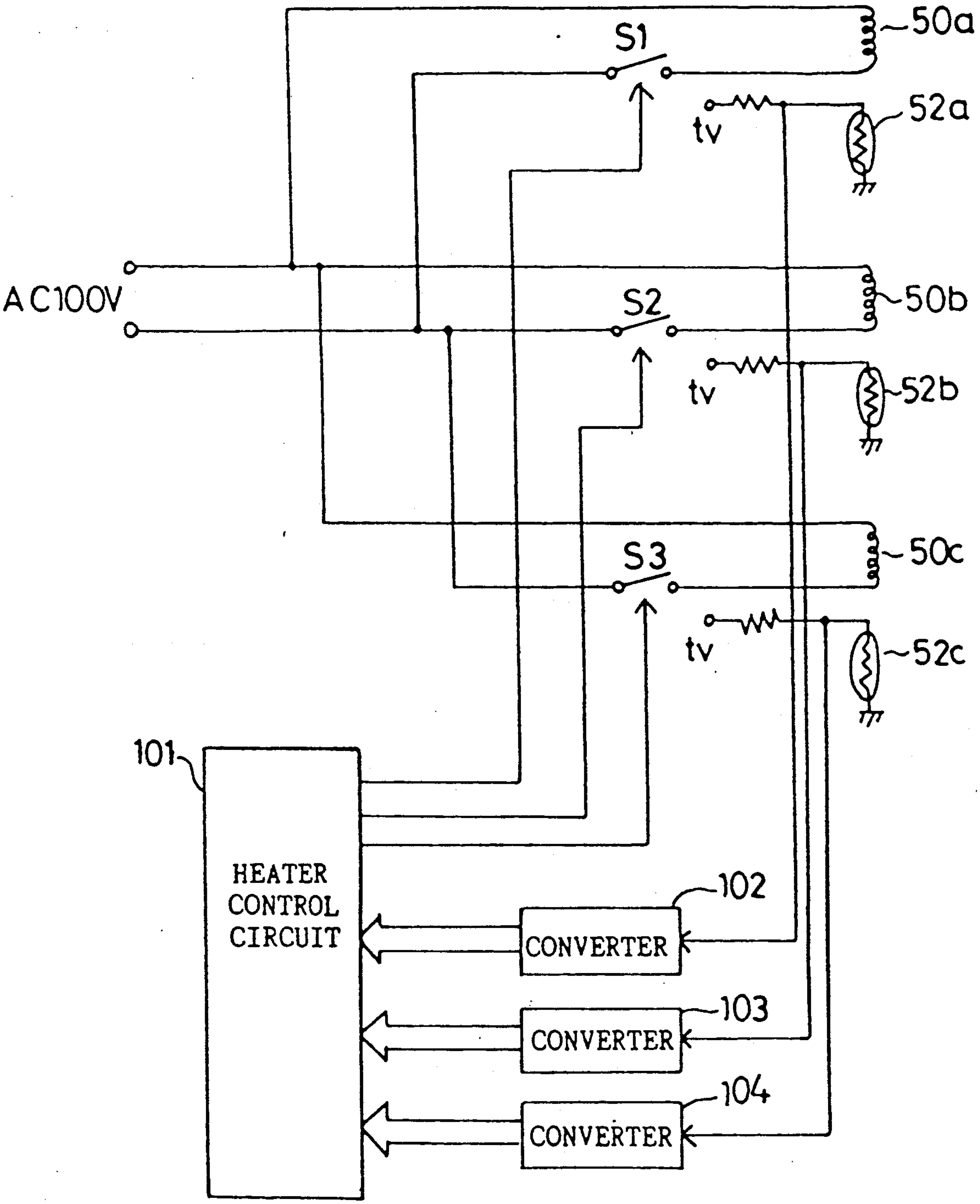
FIG. 3 is a block diagram showing the electrical arrangement of a heat fixing unit in a preferred embodiment according to the present invention.

The constitution of a temperature control will be explained hereinafter with reference to FIG. 3. The respective heaters 50*a*, 50*b* and 50*c* are connected to an ac 100 V power source via switches S1, S2 and S3 controlled by a heater control circuit 101. The analog values of temperatures detected by the temperature sensors 52*a*, 52*b* and 52*c* are converted into digital values by A/D converters 102, 103 and 104, and then, the digital values are inputted into the heater control circuit 101. The temperatures detected by the temperature sensors 52*a*, 52*b* and 52*c* are compared with the specific value. The heater control circuit 101 individually controls the switches S1, S2 and S3 in such a manner as to turn off selected switches S1, S2 and S3 when the temperatures detected by temperature sensors 52*a*, 52*b* and 52*c*, respectively, are higher than the specific value, and to switches S1, S2 and S3 when the temperatures detected by temperature sensors 52*a*, 52*b* and 52*c*, respectively, are lower than the specific value.

Figure 4:
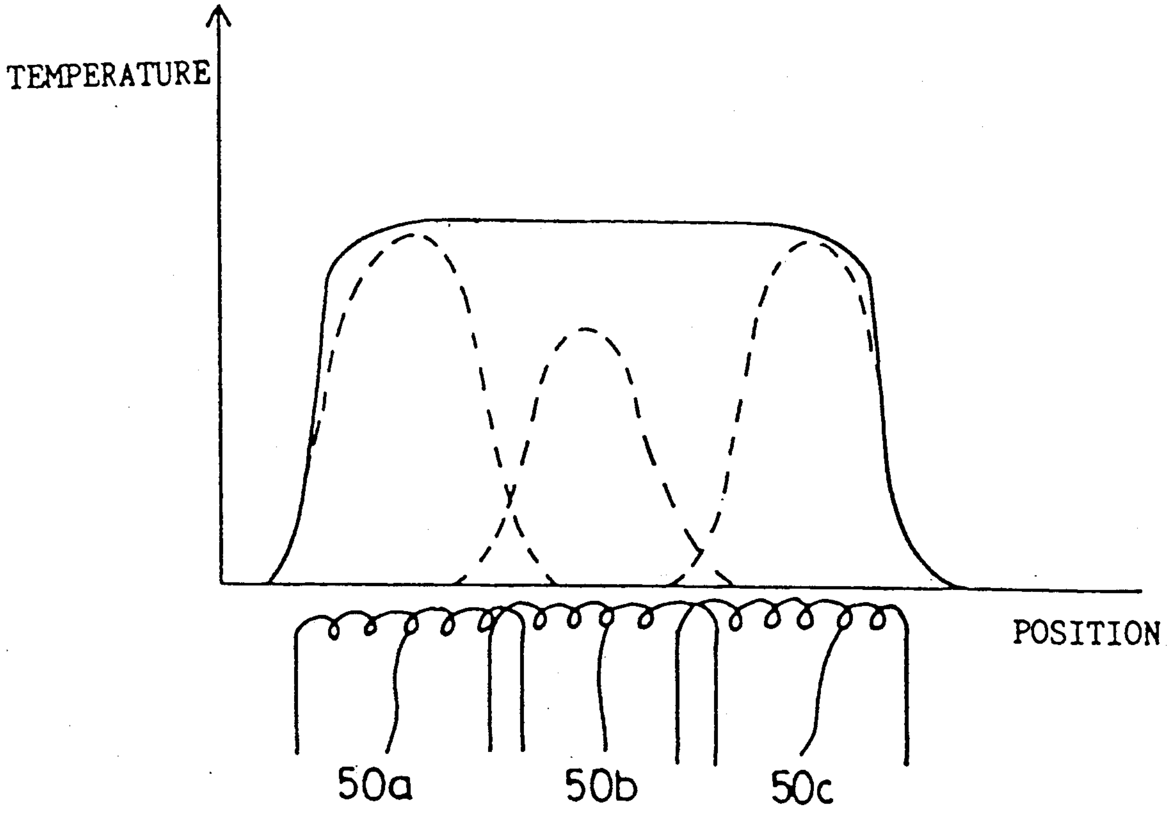
FIG. 4 is a graphic representation showing the relationship between a position and a temperature of a heat generating mechanism of a heat fixing unit in a preferred embodiment according to the present invention.
Figure 5:
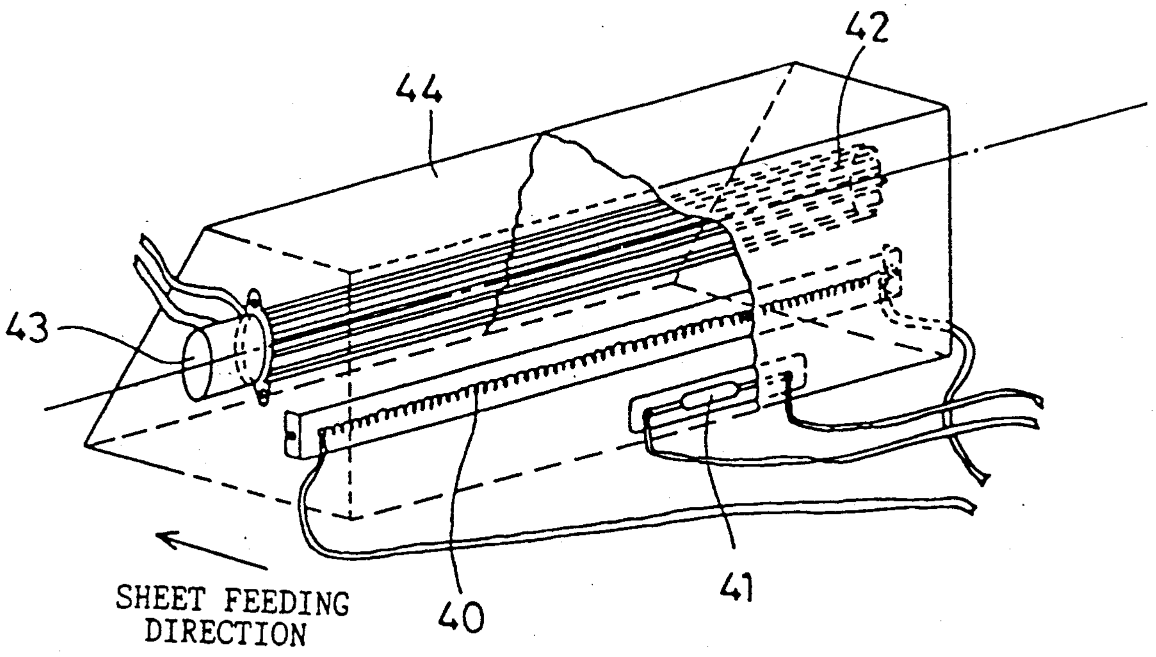
FIG.5 RELATED ART
FIG. 5 is a perspective view of a heat fixing unit according to the related art.
Figure 6:
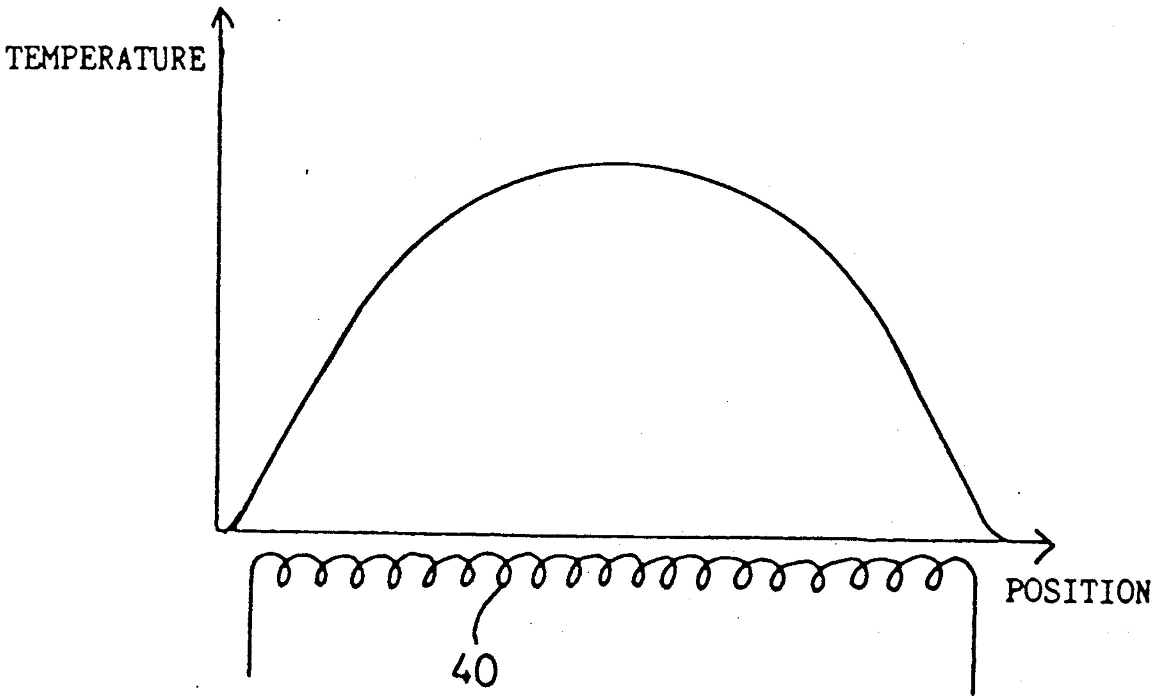
FIG.6 RELATED ART
FIG. 6 is a graphic representation showing the relationship between a position and a temperature of a single heater of a heat fixing unit according to the related art.

For example, upon exposure of heat fixing unit 32 to a temperature distribution as generated in a conventional apparatus as shown in FIG. 6, the heater control circuit 101 would increase the temperatures at both ends of the graph, that is, to prolong each ON-time of the switches S1 and S3 of the heaters 50*a* and 50*c*, as indicated by broken curves in FIG. 4, and eventually obtain a uniform temperature distribution as indicated by a solid curve in FIG. 4.

The number of divided heaters can be arbitrarily determined dependent upon the length of the heat generating mechanism 50. The material of the heaters 40 can be a nichrome wire, for example, but is not restricted to such a material. A heat generator made of ceramics or the like is applicable for such heaters.

According to this invention as set forth in the above detailed description, a uniform temperature distribution as well as a stable heat fixation with respect to an image output sheet can be obtained irrespective of the size or length of the heat generating mechanism.

While this invention has been described in conjunction with a specific embodiment thereof, it is evident that may alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A heat fixing apparatus for fixing a transferred image onto a sheet with heat application, comprising:

heat generating means having a plurality of heaters for generating heat;

a plurality of sensors, each sensor located adjacent to one said heater, each said sensor detecting a temperature of the adjacent heater; and temperature control means for individually controlling each of said heaters in response to the temperatures detected by said sensors.

2. The apparatus as claimed in claim 1, wherein said heaters have end portions and are disposed such that at least one end portion of one heater overlaps at least one end portion of another heater.

3. The apparatus as claimed in claim 1, wherein said heat generating means includes a supporting member, and wherein said heaters are disposed on said supporting member.

4. The apparatus as claimed in claim 1, wherein said temperature control means includes switching elements connected to each of said heaters, and wherein said temperature control means turns on and off said switches in response to the temperature detected by said sensors.

5. The apparatus as claimed in claim 4, wherein said temperature control means further includes analog-digital converters connected to said sensors, and wherein analog signals output by said sensors are connected into digital signals by said analog-digital converters.

6. The apparatus as claimed in claim 1, further comprising a fan for blowing air to said heaters so as to blow hot air to said sheet.

7. The apparatus as claimed in claim 1, wherein said sheet is fed in a particular direction, and wherein said heaters are arranged perpendicular to said particular direction.

8. A heat fixing apparatus for fixing a transferred image on a sheet with application of heat, comprising a housing;

heat generating means provided in said housing, said heat generating means having a plurality of separate heaters for generating heat;

a plurality of sensors provided in said housing to detect temperatures corresponding to said separate heaters; and temperature control means for individually controlling each of said heaters in response to the temperatures detected by said sensors.

9. The heat fixing apparatus as claimed in claim 8, further comprising a fan for blowing air to said heaters so as to blow hot air to said sheet.

10. The heat fixing apparatus as claimed in claim 8, wherein said sheet is fed in a particular direction, and wherein said heaters are arranged perpendicular to said particular direction.

11. The heat fixing apparatus as claimed in claim 10, wherein said heaters have end portions and are disposed such that at least one end portion of one heater overlaps at least one end portion of another heater.

12. The heat fixing apparatus as claimed in claim 10, wherein said heat generating means includes a supporting member provided in said housing and arranged perpendicular to said particular direction, and wherein said heaters are disposed on said supporting member.

13. The heat fixing apparatus as claimed in claim 12, wherein said heaters have end portions and are disposed such that at least one end portion of one heater overlaps at least one end portion of another heater.

14. The heat fixing apparatus as claimed in claim 8, wherein said temperature control means includes switching elements connected to each of said heaters, and wherein said temperature control means turns on and off said switches in response to the temperature detected by said sensors.

15. The heat fixing apparatus as claimed in claim 14, wherein said temperature control means further includes analog-digital converters connected to said sensors, and wherein analog signals output by said sensors are converted into digital signals by said analog-digital converters.

16. The heat fixing apparatus as claimed in claim 8, wherein the number of said sensors corresponds to the number of said heaters, and wherein each said sensor is located adjacent to each said heater.

* * * * *